United States Patent [19]

Vaishnavi et al.

[11] Patent Number: 5,734,642
[45] Date of Patent: Mar. 31, 1998

[54] METHOD AND APPARATUS FOR NETWORK SYNCHRONIZATION

[75] Inventors: Vick Vaishnavi, Danville; Patrick R. Kenny, Dover; Michael J. Rydeen, Fremont, all of N.H.

[73] Assignee: Cabletron Systems, Inc., Rochester, N.H.

[21] Appl. No.: 577,429

[22] Filed: Dec. 22, 1995

[51] Int. Cl.$^6$ .............................. H04L 12/24; H04L 12/26
[52] U.S. Cl. ...................... 370/255; 370/449; 340/825.08
[58] Field of Search .......................... 370/252, 254, 370/255, 346, 449, 241; 340/825.06, 825.08, 825.54; 359/200.02

[56] References Cited

U.S. PATENT DOCUMENTS

| | | |
|---|---|---|
| 5,226,120 | 7/1993 | Brown et al. . |
| 5,261,044 | 11/1993 | Dev et al. ................... 395/159 |
| 5,299,207 | 3/1994 | Fujii . |
| 5,471,399 | 11/1995 | Tanaka et al. ................... 370/241 |
| 5,483,631 | 1/1996 | Nagai et al. ................ 395/200.02 |
| 5,485,455 | 1/1996 | Dobbins et al. .................. 370/60 |
| 5,535,335 | 7/1996 | Cox et al. ................... 395/200.11 |
| 5,590,120 | 12/1996 | Vaishnavi et al. .............. 370/245 |

FOREIGN PATENT DOCUMENTS

WO 93/10495  5/1993  European Pat. Off. .

OTHER PUBLICATIONS

IEEE 1992 Network Operations and Management Symposium, (NOMS '92), Memphis, Apr. 6–9, 1992, vols. 1–3, 1 Jan. 1992, pp. 520–532, Stinson W., et al: "A State–Based Approach to Real–Time Telecommunications,".

Primary Examiner—Hassan Kizou
Attorney, Agent, or Firm—Wolf, Greenfield & Sacks, P.C.

[57] ABSTRACT

According to several aspects of the present invention, a network is monitored for status information indicative of the status of a manageable device within the network. A network manager receives the status information, and updates or initializes a device model in accordance with the status information. A state machine may be used to determine a new state for the device model, and to enable or disable the device model. The network manager may also take action to inquire as to the status of the manageable device, for example by polling the manageable device or by initiating a discovery process. The device model may be used by the network manager as a basis by which to control the manageable device, and thus control aspects of the communications within the network.

36 Claims, 6 Drawing Sheets

LEGEND:

HE: HARD BOOT MESSAGE ("HELLO") SENT FROM DEVICE

DF: FAILURE TO COMPLETE DISCOVERY PROCESS OF DEVICE ("DISCOVERY FAILURE")

DS: SUCCESSFUL COMPLETION OF DISCOVERY PROCESS ("DISCOVERY SUCCESSFUL")

CE: CONTACT ESTABLISHED DURING POLLING ("CONTACT ESTABLISHED")

CL: CONTACT LOST DURING POLLING ("CONTACT LOST")

| | PREVIOUS DEVICE STATE | | | |
|---|---|---|---|---|
| | UNKNOWN | INITIALIZED | LOST | ESTABLISHED AFTER LOST |
| HARD BOOT MESSAGE (HE) | - TRIGGER DISCOVERY | - ENABLE DEVICE MODEL | - DISABLE DEVICE MODEL | - TRIGGER DISCOVERY<br>- DISABLE DEVICE MODEL |
| DISCOVERY FAILURE (DF) | - TRIGGER DISCOVERY AGAIN | NO ACTION | NO ACTION | NO ACTION |
| DISCOVERY SUCCESSFUL (DS) | - RESET DEVICE<br>- ENABLE DEVICE MODEL | NO ACTION | NO ACTION | - RESET DEVICE<br>- ENABLE DEVICE MODEL |
| CONTACT ESTABLISHED (CE) | NO ACTION | - DISABLE DEVICE MODEL | NO ACTION | - DISABLE DEVICE MODEL |
| CONTACT LOST (CL) | - TRIGGER DISCOVERY AGAIN | NO ACTION | - RESET DEVICE<br>- ENABLE DEVICE MODEL | NO ACTION |

DEVICE INFORMATION

METHOD AND APPARATUS FOR NETWORK SYNCHRONIZATION

BACKGROUND OF THE INVENTION

1. Field of the Invention

This invention relates generally to communications networks, and more particularly to monitoring the status of manageable network devices.

2. Discussion of the Related Art

Communications networks provide a capability for one element, referred to as a source, to transmit data to another element, referred to as a destination. The data may be transmitted along a path that includes several devices. Examples of such devices are repeaters, switches, routers, bridges, and hubs. Generally, each of the devices may be characterized as manageable, self-managing, or a combination of manageable and self-managing.

A manageable device is one which receives control from an external manager. For example, an external manager may reside in another device, separate from the manageable device and coupled to the same network as the manageable device. The external manager, which typically controls several manageable devices, may perform functions such as: setting connections from an ingress port to an egress port of the manageable device; removing connections of the manageable device; and retrieving information used for the external manager to control the manageable devices under the external manager's control.

A self-managing device is one which does not use an external manager for control. A device may also have some aspects which are controlled by an external manager and some aspects which are self-managed.

In order for the external manager to effectively control a device, it is useful for the external manager to have information regarding the state of the device. The term "device-manager synchronization" refers to a situation in which the external manager is able to determine the state of devices under control by the external manager.

Known external managers retrieve information regarding the status of each of the devices under control by the external manager. The external manager then determines, from the retrieved information, that each device is in one of only two possible states—either "up" (i.e. operable) or "down" (i.e. not operable). If no information can be retrieved from a particular device, the external manager determines that particular device is "down."

A disadvantage to this approach is that a device may actually be in one of more than only two possible states. For example, a device may be in a "busy" state, in which the device is operable but not able to provide status information to the external manager at a particular time. In such a situation, an external manager would determine that the device is "down," even though the device may be able to perform network functions in the near future. As a result of this determination, the existing external manager may perform certain actions to provide a path for network data without using the "down" device, even though the "down" device may be available for such use. Thus, in the prior art, a network may have an inefficient arrangement resulting in adverse effects such as increased cost, increased data latency and decreased network reliability.

It would be advantageous to provide a capability for an external manager to more effectively determine the status of a manageable device.

SUMMARY OF THE INVENTION

According to several aspects of the present invention, a network is monitored for status information indicative of the status of a manageable device within the network. A network manager receives the status information, and updates or initializes a device model in accordance with the status information. A state machine may be used to determine a new state for the device model, and to enable or disable the device model. The network manager may also take action to inquire as to the status of the manageable device, for example by polling the manageable device or by initiating a discovery process. The device model may be used by the network manager as a basis by which to control the manageable device, and thus control aspects of the communications within the network.

An embodiment of the invention is directed to a method for determining a status of a device in a communications network, comprising the steps of receiving a status report including information regarding the device, determining a previous state of the device, and maintaining a model of the device based upon a combination of the previous state of the device and the information regarding the device. The method may further comprise a step of querying the device to provide additional information, and the step of maintaining may include maintaining the model of the device based upon a combination of the previous state of the device, the information regarding the device, and the additional information.

Another embodiment of the invention is directed to an apparatus for determining a status of a device in a communications network, comprising means for receiving a status report including information regarding the device, means for determining a previous state of the device, and means for maintaining a model of the device based upon a combination of the previous state of the device and the information regarding the device.

Yet another embodiment of the invention is directed to an apparatus for determining a status of a device in a communications network, comprising a model of the device containing information regarding a previous state of the device, and a model control module coupled to the model of the device. The model control module has an input that receives a status report including information regarding the device, and an output that maintains the model of the device based upon a combination of the previous state of the device and the information regarding the device.

In any of the embodiments, the status report may be a message indicative of a hard reboot of the device, results of a discovery process performed on the communications network, or results of a polling process. Additionally, a discovery process, a polling process, or a reset process may be performed in response to the state of the model of the device. The model of the device may be maintained in an enabled state indicative that the device is ready to be controlled by a network manager, or a disabled state indicative that the device is not ready to be controlled by a network manager.

Additionally, the model of the device may be maintained in one of a predetermined plurality of states that includes more than two states, for example an unknown state indicative that there is insufficient information to determine a capability of the device, an initialized state indicative that the device has been discovered and is ready to be controlled by a network manager, a lost state indicative that the device was previously ready to be controlled but did not respond to a status inquiry, and an established after lost state indicative that a successful discovery has not yet been performed with respect to the device. Also, a state machine may be provided which receives the previous state of the device and the information regarding the device, and provides an output based upon which the model of the device is maintained.

BRIEF DESCRIPTION OF THE DRAWINGS

Other features and advantages of the present invention shall appear from the following description of an exemplary embodiment, said description being made with reference to the appended drawings, of which:

FIG. 6 is a table illustrating more detail of the state machine of FIG. 5; and

DETAILED DESCRIPTION

Figure 1:
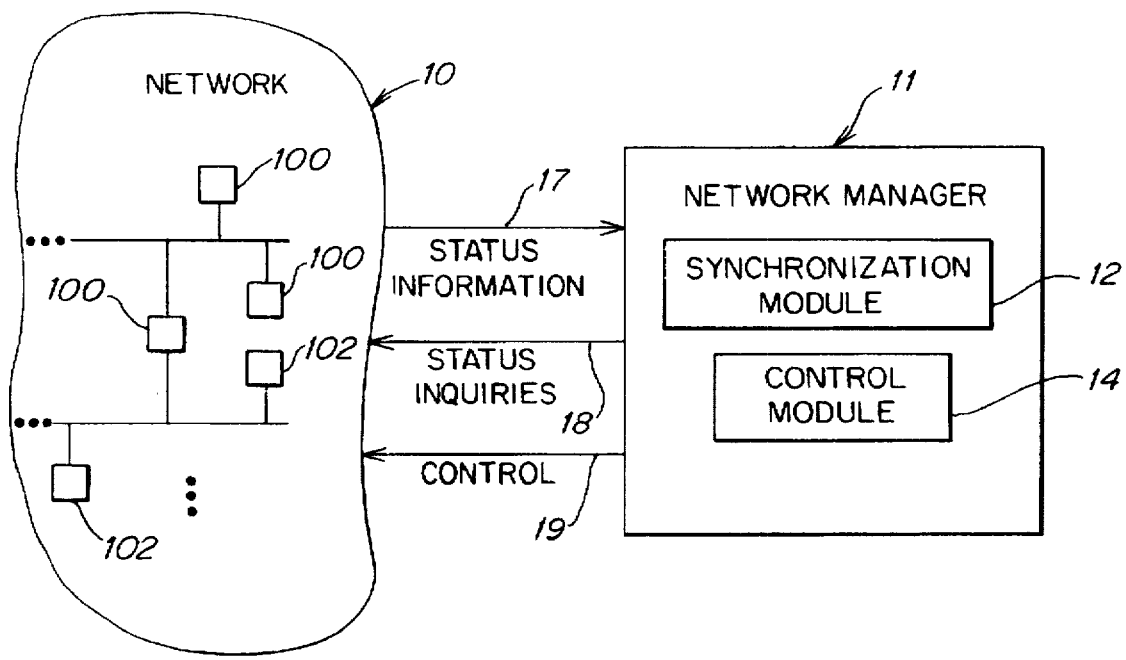
FIG. 1 illustrates a network having some manageable devices under control of a network manager in accordance with one embodiment of the invention.

FIG. 1 shows a network 10 having manageable devices, and a network manager 11 for providing control to the manageable devices 100 of the network 10. The network 10 may also include self-managing devices 102 as well as manageable devices 100. Additionally, the manageable devices 100 may be self-managing in some respects and manageable in other respects.

An understanding of aspects of the present invention may be furthered by an understanding of the model-based network management system known as Spectrum™, which is described in U.S. Pat. No. 5,261,044, issued Nov. 9, 1993 to R. Dev et al., and hereby incorporated by reference in its entirety. The Spectrum™ network management system is commercially available and also described in various user manuals and literature available from Cabletron Systems, Inc., Rochester, N.H.

Additionally, U.S. Pat. No. 5,485,455 entitled NETWORK HAVING SECURE FAST SWITCHING AND GUARANTEED QUALITY OF SERVICE and issued on Jan. 16, 1996 to Dobbins et al., describes techniques for establishing and controlling virtual connections through a communications network, and is hereby incorporated by reference in its entirety.

In one embodiment of the present invention, the network manager includes a synchronization module 12 for determining the status of the manageable devices 100, and a control module 14 for providing appropriate control as described above. In operation, the synchronization module 12 receives status information 17 from the network, and provides status inquiries 18 to the network 10. The synchronization module 12 determines the status of the manageable devices of the network 10, and provides this status information to the control module 14. The control module 14 determines appropriate action to take, and provides the appropriate control 19 to the manageable devices of the network 10. The synchronization module may also provide control 19 to the devices of the network if such control is advantageous to achieving device-manager synchronization.

Figure 2:
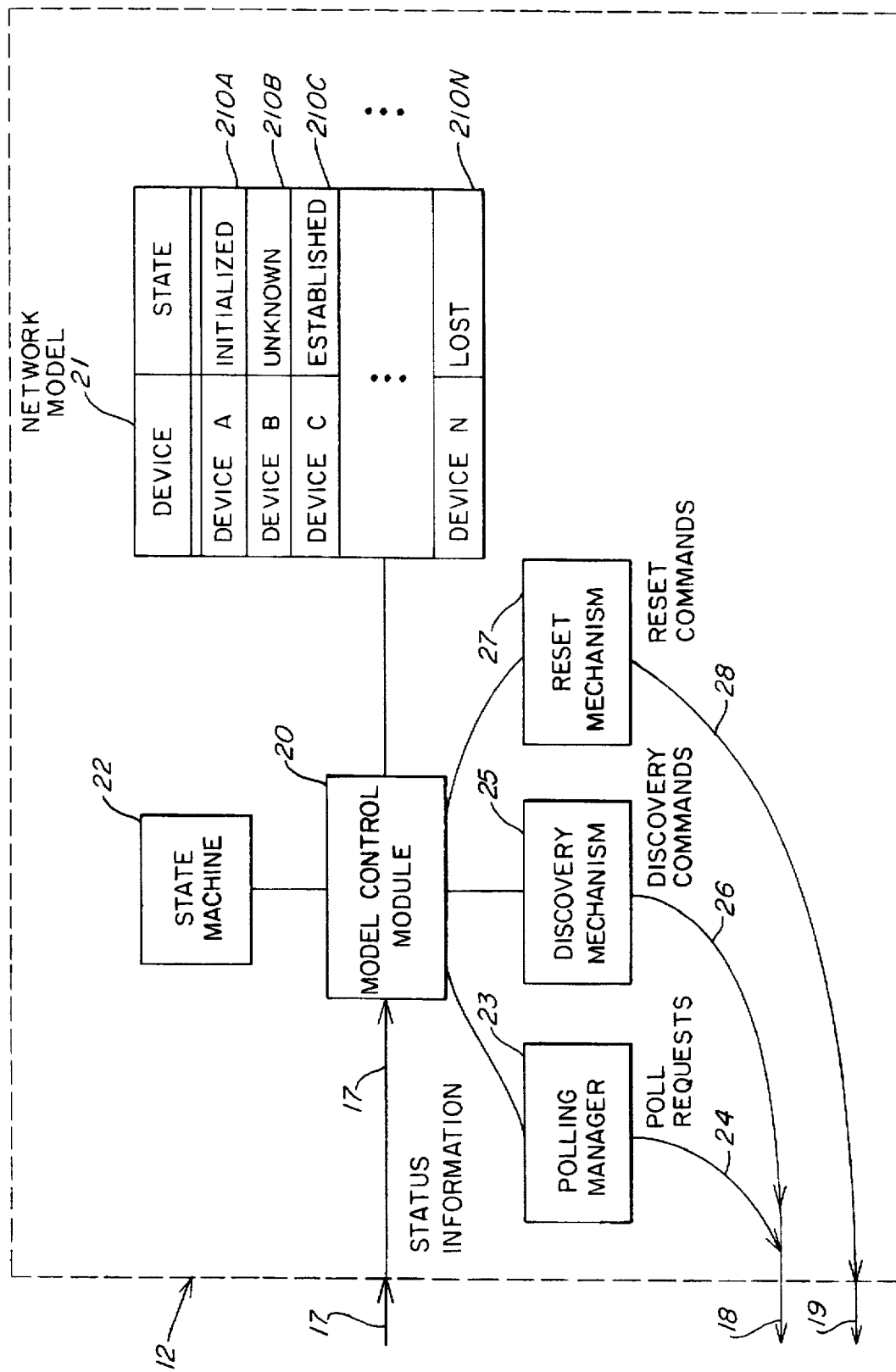
FIG. 2 depicts detail of an embodiment of the synchronization module of the network manager illustrated in FIG. 1.

FIG. 2 depicts detail of an embodiment of the synchronization module 12 of the network manager illustrated in FIG. 1. In this embodiment, the synchronization module 12 includes a model control module 20 coupled to a network model 21 that includes device models 210A, 210B, 210C . . . 210N. The model control module 20 is also coupled to each of a state machine 22, a polling manager 23, a discovery mechanism 25, and a reset mechanism 27. Generally, the model control module creates and maintains device models 210 that represent the status of manageable devices 100 of the network 10. The network model 21 may contain additional information, such as connectivity information with respect to the devices of the network 10. When the state of network model 21 matches the state of the actual network 10, the synchronization has been achieved. The control module 14 may then read the status of the device models 210 in order to determine appropriate control 19 to be provided to the network 10.

The synchronization module 12 may be implemented as a software module, for example an object-oriented software module. For example, the device models 210 may include an object representation for each device, wherein the object representation is indicative of the status of the device.

Figure 3:
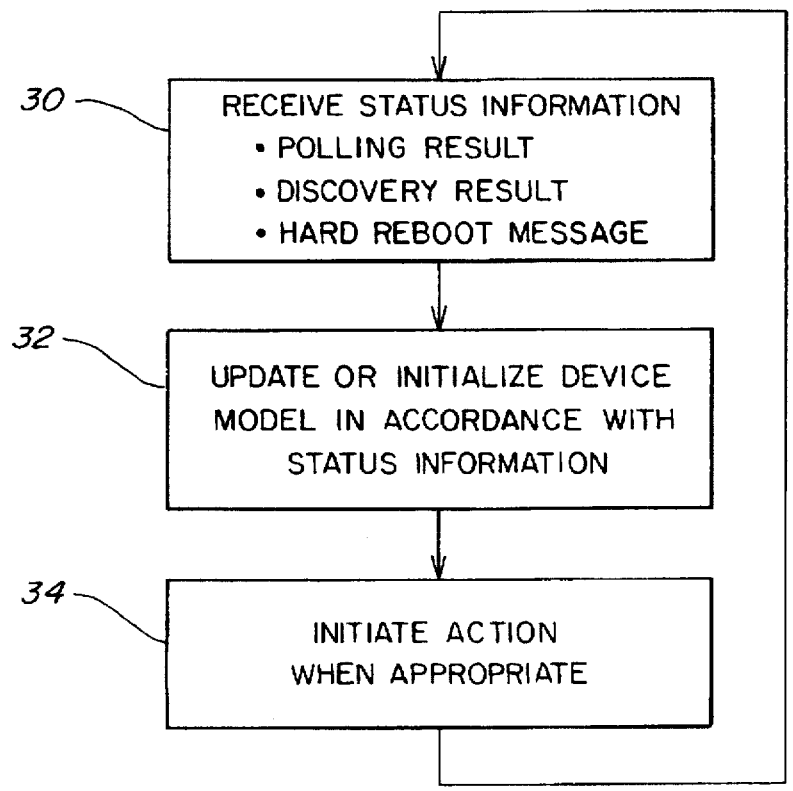
FIG. 3 is a flow diagram of a process performed by the synchronization module of FIG. 2.
Figure 4:
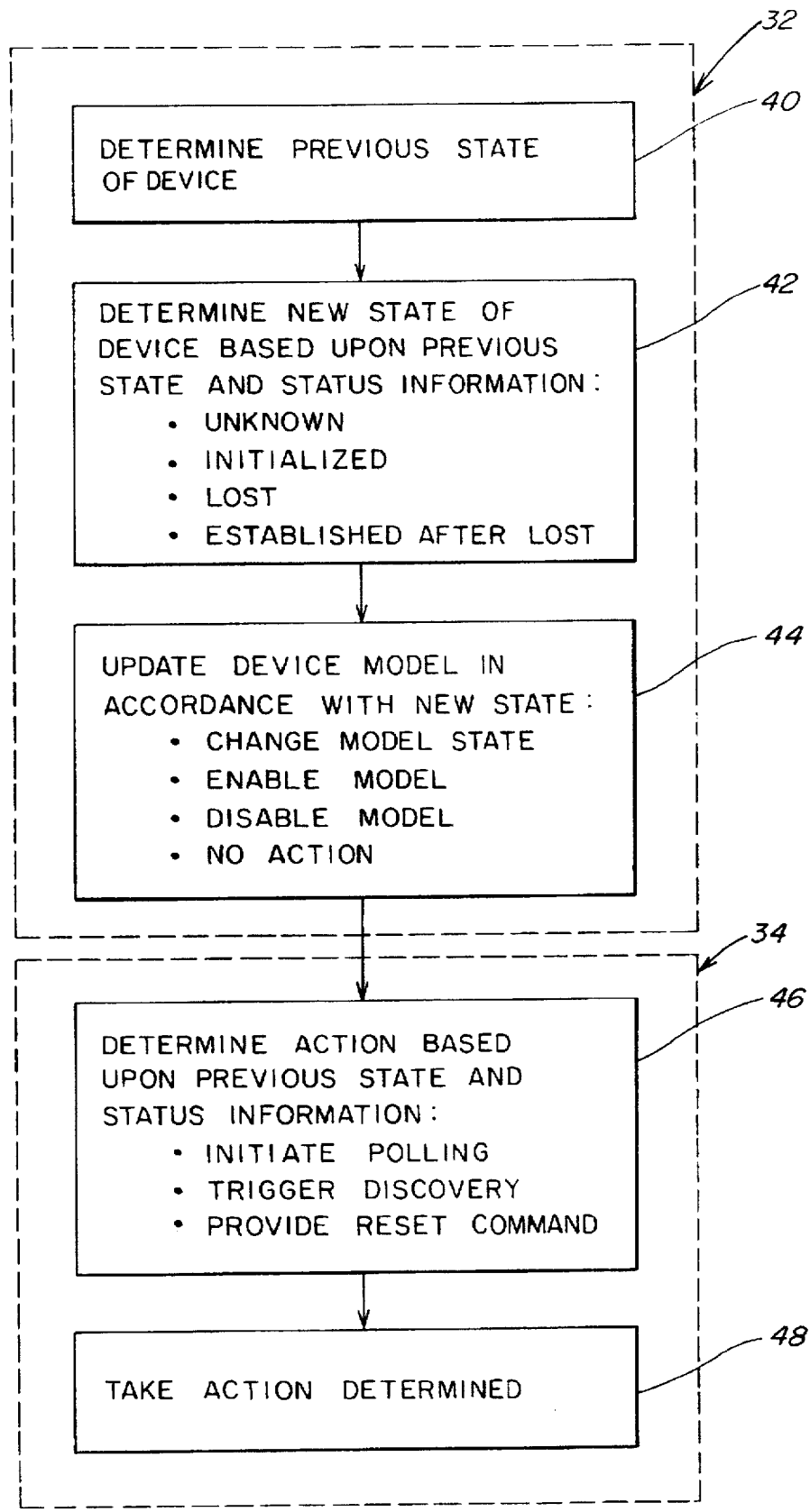
FIG. 4 is a flow diagram showing more detail of the process of FIG. 3.
Figure 7:
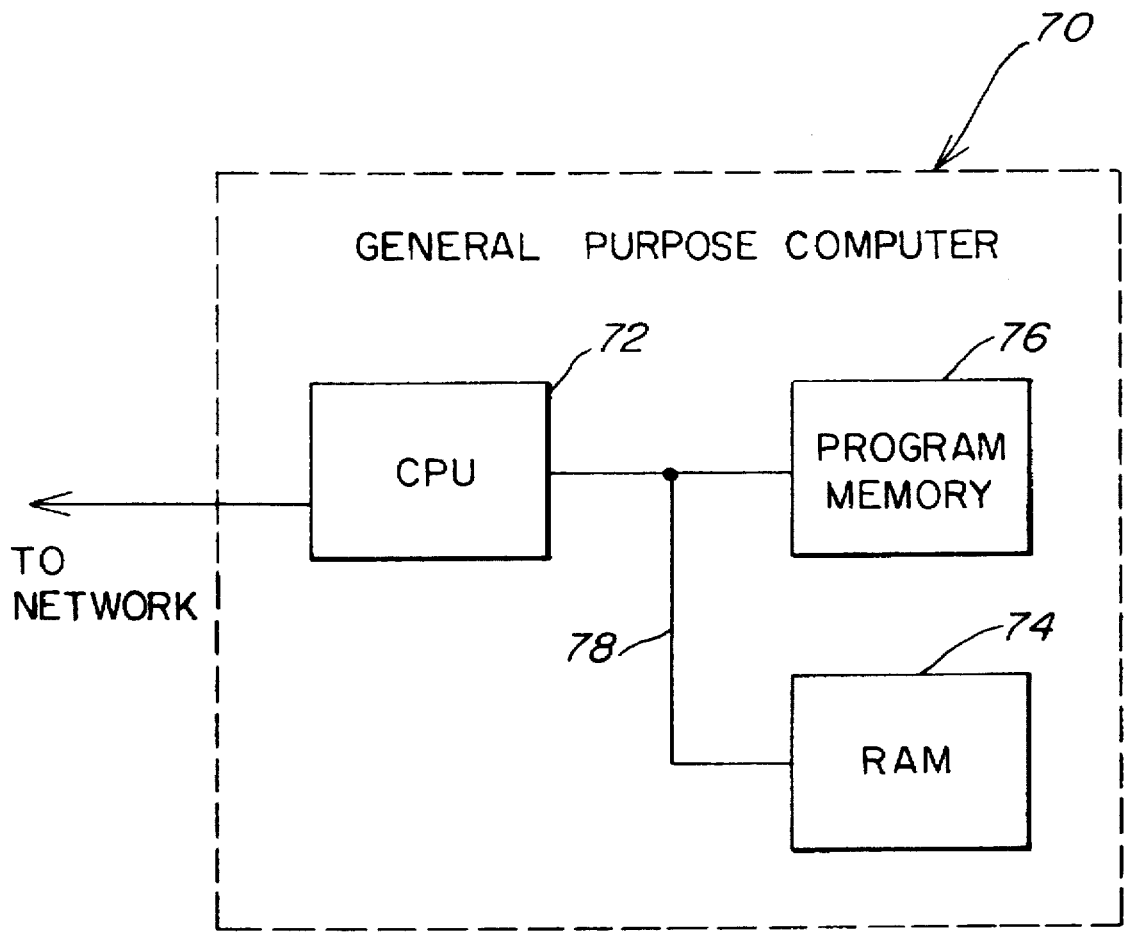
FIG. 7 illustrates a general purpose computer which may be used in one embodiment of the network manager illustrated in FIG. 1.

Additionally, in one embodiment, the different sub-elements of the synchronization module 12 are implemented as software on a floppy disk or hard drive, which controls a computer, for example a general purpose computer such as a workstation, a mainframe or a personal computer, to perform steps of the disclosed processes such as those of FIG. 3 and FIG. 4. Such a general purpose computer 70 as shown in FIG. 7, typically includes a central processing unit 72 (CPU) coupled to random access memory 74(RAM) and program memory 76 via a data bus 78. The general purpose computer 70 may be connected to the network 10 in order to receive reports, and may provide commands to devices on the network in order to control the network configuration.

Alternatively, the sub-elements of the synchronization module 12 may be implemented as special purpose electronic hardware. Additionally, in either a hardware or software embodiment, the functions performed by the different elements within the synchronization module 12 may be combined in varying arrangements of hardware and software.

Generally, the network manager 11 receives status information 17 from the network 10 and provides a monitoring capability to determine the status of manageable devices within the network 10. In one embodiment, there are several different forms of the status information 17, which may be received either from one of the manageable devices or from other devices within the network 10 that contain information regarding one of the manageable devices. For example, the status information 17 may include a hardboot message, sent from a manageable device when the manageable device is initialized. This message, also called a "HELLO" message, may be sent to the network manager 10 from the manageable device's signaling mechanism only following a hard boot of the device. The receipt of such a message by the synchronization module 12 may be referred to as an initialization event (HE) with respect to the device 100 that sends the "HELLO" message. Such an initialization event (HE) facilitates the capability of the synchronization module 12 to distinguish between a hard boot of a device and a temporary loss of contact due to the device being too busy to respond to the manager 11.

Another type of status information 17 includes a response by a device to a poll request by the synchronization module 12. As shown in FIG. 2, the model control module 20 is coupled to a polling manager 23. The polling manager 23 provides poll requests 24 to devices of the network 10 to query the status of these devices. The polling manager may include an internal clock or timer to trigger the transmission of a poll request 24. In one embodiment, the polling frequency is approximately 10 seconds. In response to the poll request 24, a device may return a message indicative of contact being established between the network manager 11 and the device. The receipt by the synchronization module 12 of a message indicative of such a situation may be referred to as a "contact established" (CE) event.

It is also possible that a polled device may not respond to a poll request 24. In such a situation, the polling manager may determine that a predetermined amount of time has passed without receiving a response to a particular poll request 24, which is indicative of a "contact lost" (CL) event.

The status information 17 may also include results from a discovery process. Discovery, in this context, refers to querying the appropriate devices or ports of the devices directly to obtain information regarding their connectivity or other status. The discovery mechanism 25 may also include an entirely separate interface from that of the other status information 17 and status inquiries 18, and may use a standard management protocol such as SNMP (Simple Network Management Protocol). The SNMP standard defines a set of variables that a device must keep to comply with SNMP, and includes adjacency information regarding other devices adjacent to the device being discovered. SNMP information typically includes three parts: structure of management information (SMI); management information base (MIB); and the SNMP protocol itself. The SMI and MIB define and store the set of managed entities as defined by the discovery mechanism 25, while the SNMP protocol enables information to be conveyed to and from the managed devices. The discovery mechanism 25 may exist as a separate off-the-shelf package.

The model control module 20 may control the discovery mechanism 25 to perform such a discovery process. In response, the discovery mechanism 25 provides discovery commands 26 to the appropriate devices of the network 10, and receives responses (as status information 17) to the discovery commands 26. The discovery mechanism 25 may also provide further discovery commands 26 based upon the results of earlier discovery commands. Accordingly, a discovery process may result in a "discovery successful" (DS) event in which the discovery mechanism 25 was able to acquire the desired information regarding a device, or a "discovery failure" (DF) event, in which a discovery process was not successfully completed with respect to a particular device.

Both poll requests 24 and discovery commands 26 are included in the status inquiries 18 shown in FIG. 1. Additionally, other techniques may be used to acquire information regarding the status of devices within the network 10, and are meant to be within the scope of the term "status information."

A reset mechanism 27 may be controlled by the model control module 20 to provide a reset command 28 to a particular device. The reset command 28 is typically a control message sent to the device, and the device contains hardware and software that performs the reset. A reset, in this context, refers to an initialization, for example an initialization of control parameters within the device. This is typically different from a hard reboot of the device, which sets all of the hardware and software of the device to a predetermined state. For example, a hard reboot typically results in a loss of data stored in random access memory (RAM), while a reset may maintain some of this data.

The operation of an embodiment of the model control module 20 is shown in the flow diagram of FIG. 3. In step 30, the model control module 20 receives status information 17. As described above, the status information 17 may include a polling result, a discovery result, a hard reboot message (e.g., "HELLO"), as well as other information. Additionally, the actual reports that make up the status information 17 may be received directly by the polling manger 23 and the discovery mechanism 25, which in turn may provide appropriate messages to the model control module 20 to initiate the events, for example those described above (HE, CE, CL, DS, DF). In step 32, the model control module 20 updates or initializes a device model 210 in accordance with the status information received in step 30. In step 34, the model control module 20 initiates action, when appropriate, for example to gain more information regarding the status of a device.

FIG. 4 shows more detail of steps 32 and 34 of FIG. 3. In step 40, the previous state of a device is determined. Step 40 may be achieved by accessing a memory location that stores the status information of a device, or by querying a model such as the object-oriented model of the device models 210 described above. In step 42, the new state of the device is determined based upon the previous state and the status information received in step 30. The new state may be one of a plurality of states that include an "unknown" state, an "initialized" state, a "lost" state, and an "established after lost" state. Alternatively, the plurality of states may include a different set of states, for example "up," "down," and "unknown." By facilitating a device model 210 to be one of greater than only two possible states, the synchronization module 12 may more accurately represent the status of each device 100, and be less subject to lost messages or devices that are too busy to respond to queries.

The "unknown" state of a device is indicative that the synchronization module 12 has no information regarding the status of the device. Often, in such a case, invoking the discovery mechanism may be the most effective manner in which to determine the status of such a device.

The "initialized" state of a device is indicative that the device has been discovered and is ready to be controlled by the control module 14. This is typically the most common state of a device, because it is a state in which the device may be controlled by the control module 14.

If a device is in the "lost" state, the device usually cannot be contacted. The device may have been too busy to respond to a status inquiry, or the device may have failed or been recently rebooted. Generally, actions are taken by the network manager 11 to work around the lost device, until information is received from the lost device indicative of the lost device changing status.

In an "established after lost" state, a device may be contacted and is ready to be controlled by the control module This state is similar to the "initialized" state, but is indicative that a successful discovery has not yet been performed with respect to the device.

Step 42 may be performed through the use of the state machine 22 shown in FIG. 2. The state machine 22 may be implemented as a hardware machine as discussed earlier, or may be implemented in software as predetermined logic, as predetermined memory locations, or as a lookup table. To use the state machine 22, the model control module 20 provides the previous state determined in step 40 and the status information received in step 30 to the state machine, and the state machine provides in response a new state that represents the current status of the device.

Figure 5:
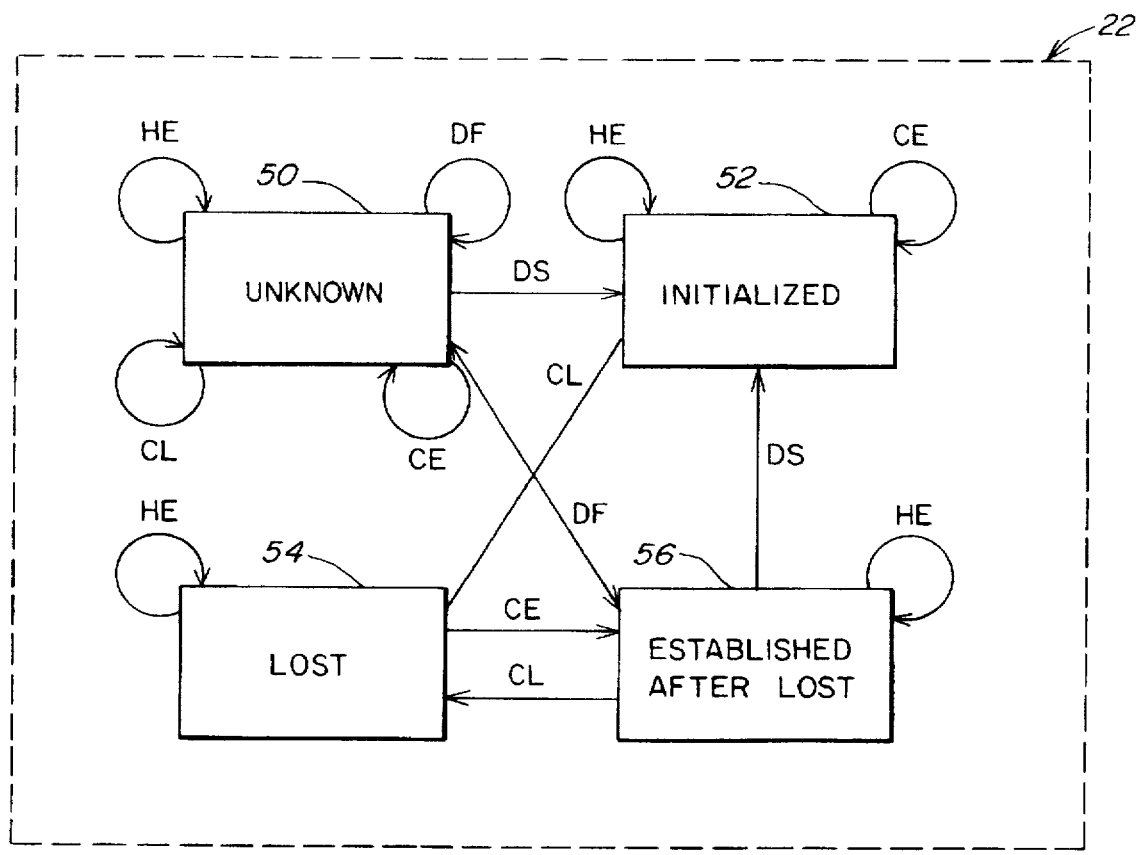
FIG. 5 is a diagram of the state machine within the synchronization module shown in FIG. 2.

The structure of one embodiment of the state machine is depicted in FIG. 5. FIG. 5 shows four different states including the unknown state 50, the initialized state 52, the lost state 54, and the established after lost state 56. FIG. 5 also shows the events described earlier (HE, DF, DS, CE, and CL), and the state change that takes place, if any, as a result of a particular event being received for a device that is in a particular state.

As a result of the new state determined in step 42, in step 44 the device model 210 is updated in accordance with the new state, or if the new state is the same as the old state, then no action may be taken. Additionally, the device model 210 may be enabled or disabled. Enabling and disable a device model 210 are actions which allow the control module 14 to know whether certain actions may be performed with respect to the device represented by the particular device model. When a device model 210 is disabled, for example, the control module 14 may avoid attempting to set up a connection through the device represented by the disabled device model 210. Instead, the control module 14 may instead attempt to use another device, for example, in order to provide an appropriate path for data. In summary, a disabled device model is indicative that the device is not usable by the control module 14, while an enabled device model is indicative that the device is usable by the control module 14.

Steps 46 and 48 illustrate more detail of step 34 of FIG. 3. In step 46, an appropriate action is determined based upon the previous state of a device and the status information received in step 30. This action includes action related to the synchronization of the device, and is typically different from the control of a device which is for the purposes of network control. In general, the actions which may be taken include: initiating polling; triggering discovery; and providing a reset command. Each of these actions are described above with reference to FIG. 2.

The state machine 22 may also be used to determine the action to take with respect to a device. As with the state change function of the state machine 22 described above, this function of the state machine 22 may be implemented in several ways, including accessing memory locations or lookup tables, for example.

FIG. 6 is a state table 60 which indicates the action to be taken in response to the synchronization module 12 receiving new device information about a device having a previous state. Four previous states are defined in the four columns, the four states being similar to the four states shown in FIG. 5. The rows of the state table 60 are indicative of the event, for example one of the events HE, DF, DS, CE, and CL. The intersection between the column representing the previous state of a device model 210 and the row representing the event indicated by the information received in step 30 shows the appropriate action.

For example, if a device was previously in an unknown state and a discovery successful (DS) event is received with respect to the device, then the device would be reset and the model for that device would be enabled, so that the corresponding device in the network 10 could be controlled by the control module 14. Additionally, as shown in FIG. 5, in such a case the state of the device model would be changed from "unknown" to "initialized."

Thus, for each event there may be a new state for a device model as well as action to be taken by the synchronization module 12.

The examples below illustrate the operation of an embodiment of the synchronization module 12.

A first example is how a network manager 11 synchronizes, during initialization, with the network devices 100 controlled by the network manager 11. The network manager 11 typically has information regarding at least one network device before initializing, so that the network manager 11 can perform discovery on this network device to learn about the remainder of the network 10. When the network manager 11 is presented with a new device (the device could be a network address), it creates a device model 210 for that device and sets the device model 210 to the "unknown" state. The network manager 11 then invokes the discovery mechanism 25 on the device. The network manager 11 also registers the device with the polling mechanism 23 so it can appropriately monitor the device. The polling can be asynchronous with the discovery mechanism 25 so it is not guaranteed which event may be received from the manager's mechanisms first—the contact established (CE), or a discovery successful (DS) or discovery failure (DF). According to an embodiment of the state machine 22, only the success from the discovery mechanism 25 (e.g., a DS event) will cause the model control module 20 to reset the device 100 and enable the device model 210, and transition the device model 210 to the "initialized" state. This state is the most common running state of the device model, and is indicative that the device 100 is now ready to be manipulated by the network manager 11. In accordance with this embodiment of the state machine 22, the only event which can remove the device model from the initialized state is a contact lost (CL) event. This can be considered as a negative event, and results in the transition of the device model's state to "lost." If a contact established (CE) event is received for the device after the device model has been transitioned to the "initialized" state, then the network manager 11 may ignore the CE event (i.e. takes no action), instead of triggering the discovery mechanism 25 again.

A second example is a situation in which a network manager 11 is in synchronization with the manageable devices 100 of the network 11, but then one of the devices, for example a switch, hard resets for some reason. For example, the device model of the device may be in the "initialized" state prior to the hard reset. In accordance with an embodiment of the state machine 22, the network manager's polling mechanism 23 discovers that it can not contact the device (because the device has recently had a hard reset), and thus sends a contact lost (CL) event to the model control module 20. As a result, the model control module 20 disables the model of the switch and transitions the model state to "lost."

When the switch finally boots back up, the synchronization module 12 may rediscover the switch because the devices adjacent to the switch may have changed from the time that the switch had a hard reset. Eventually, the switch will be active, and the polling manager 23 will send a contact established (CE) event to the model control module 20. As a result, the synchronization module 12 resets the switch so that the switch is initialized properly. The synchronization module 12 then enables the model of the switch, and sets the model state to "established after lost." At some later time, the switch will likely send the "HELLO" message, letting the synchronization model know that the switch was successfully reset, and may now be rediscovered.

When the resulting HE event is seen by the model control module 20, the model control module 20 disables the model of the switch and triggers the discovery mechanism 25. The device model 210 is disabled because after discovery is complete, the switch might be reset again for any of a number of reasons, for example by the control module 14. In such a situation, there should be no manipulation of the switch until after the reset, because all of the information that was just programmed into the switch by the control module 14 will be lost when it is reset. Once the discovery stage is complete, the switch model state is set to "initialized."

In a third example, a device becomes too busy to respond and as a result, the polling mechanism 22 reports that it has lost contact with the particular network device by providing a CL event. Similar actions are performed as in the second example, but this time a "HELLO" message will not be received, because the device was not hard reset, and the associated device model will thus remain in the "established after lost" state. As was noted before, this state is similar to the "initialized" state, so that the device may be manipulated by the control module 14.

Having thus described at least one embodiment of the invention, various alterations, modifications, and improvements will readily occur to those skilled in the art. Such alterations, modifications, and improvements are intended to be within the spirit and scope of the invention. For example, states other than those specifically delineated may be provided in a state machine, and similar results may be achieved. Additionally, the functions disclosed may be centralized in a single network manager 11 as described, or may be distributed in several computing devices. Accordingly, the foregoing description is by way of example only, and not intended to be limiting. The invention is limited only as defined in the following claims and the equivalents thereto.

What is claimed is:

1. A method for determining a status of a device in a communications network, comprising the steps of:
   receiving a status report, including information regarding the device;
   determining a previous state of the device; and
   maintaining a model of the device based upon a combination of the previous state of the device and the information regarding the device, wherein the step of maintaining includes setting a state of the model of the device to one of a predetermined plurality of states, the predetermined plurality of states including an established after lost state indicative that a successful discovery has not yet been performed with respect to the device.

2. The method of claim 1, further comprising the step of querying the device to provide additional information, and wherein the step of maintaining includes maintaining the model of the device based upon a combination of the previous state of the device, the information regarding the device, and the additional information.

3. The method of claim 1, wherein the step of receiving the status report includes receiving a message indicative of a hard reboot of the device.

4. The method of claim 1, wherein the step of receiving the status report includes receiving results of a discovery process performed on the communications network.

5. The method of claim 4 further comprising the step of initiating the discovery process in response to a state of the model of the device.

6. The method of claim 1, wherein the step of receiving the status report includes receiving results of a polling process.

7. The method of claim 1, further comprising the step of initiating the polling process in response to a state of the model of the device.

8. The method of claim 1, further comprising the step of providing a reset command to the device in response to a state of the model of the device.

9. The method of claim 1, wherein the step of maintaining includes enabling the model to indicate that the device is ready to be controlled by a network manager.

10. The method of claim 1 wherein the step of maintaining includes disabling the model to indicate that the device is not ready to be controlled by a network manager.

11. The method of claim 1, wherein the predetermined plurality of states further includes:
   an unknown state indicative that there is insufficient information to determine a capability of the device;
   an initialized state indicative that the device has been discovered and is ready to be controlled by a network manager; and
   a lost state indicative that the device was previously ready to be controlled but did not respond to a status inquiry.

12. The method of claim 1, wherein the step of maintaining includes the steps of:
   providing the previous state of the device and the information regarding the device to a state machine;
   receiving an output of the state machine, the output being responsive to the previous state of the device and the information regarding the device; and
   maintaining the model in accordance with the output of the state machine.

13. An apparatus for determining a status of a device in a communications network, the apparatus comprising:
   means for receiving a status report, including information regarding the device;
   means for determining a previous state of the device; and
   means for maintaining a model of the device based upon a combination of the previous state of the device and the information regarding the device, wherein the means for maintaining includes means for setting a state of the model of the device to one of a predetermined plurality of states, the predetermined plurality of states including an established after lost state indicative that a successful discovery has not yet been performed with respect to the device.

14. The apparatus of claim 13 further comprising means for querying the device to provide additional information, and wherein the means for maintaining includes means for maintaining the model of the device based upon a combination of the previous state of the device, the information regarding the device, and the additional information.

15. The apparatus of claim 13, wherein the status report includes a message indicative of a hard reboot of the device.

16. The apparatus of claim 13, wherein the status report includes results of a discovery process performed on the communications network.

17. The apparatus of claim 16, further comprising means for initiating the discovery process in response to a state of the model of the device.

18. The apparatus of claim 13, wherein the status report includes results of a polling process.

19. The apparatus of claim 18, further comprising means for initiating the polling process in response to a state of the model of the device.

20. The apparatus of claim 13, further comprising means for providing a reset command to the device in response to a state of the model of the device.

21. The apparatus of claim 13, wherein the means for maintaining includes means for enabling the model to indicate that the device is ready to be controlled by a network manager.

22. The apparatus of claim 13, wherein the means for maintaining includes means for disabling the model to indicate that the device is not ready to be controlled by a network manager.

23. The apparatus of claim 13, wherein the predetermined plurality of states further includes:

an unknown state indicative that there is insufficient information to determine a capability of the device;

an initialized state indicative that the device has been discovered and is ready to be controlled by a network manager; and a lost state indicative that the device was previously ready to be controlled but did not respond to a status inquiry.

24. The apparatus of claim 13, wherein the means for maintaining includes:

means for providing the previous state of the device and the information regarding the device to a state machine;

means for receiving an output of the state machine, the output being responsive to the previous state of the device and the information regarding the device; and means for maintaining the model in accordance with the output of the state machine.

25. An apparatus for determining a status of a device in a communications network, the apparatus comprising:

a model of the device containing information regarding a previous state of the device;

a model control module coupled to the model of the device, the model control module having an input that receives a status report including information regarding the device, and an output that maintains the model of the device based upon a combination of the previous state of the device and the information regarding the device, wherein the output of the model control module sets a state of the model of the device to one of a predetermined plurality of states, the predetermined plurality of states including an established after lost state indicative that a successful discovery has not yet been performed with respect to the device.

26. The apparatus of claim 25, further comprising a mechanism, coupled to the model control module, the mechanism providing a query to the device so that the device provides additional information, the model control module maintaining the model of the device based upon a combination of the previous state of the device, the information regarding the device, and the additional information.

27. The apparatus of claim 25, wherein the status report includes a message indicative of a hard reboot of the device.

28. The apparatus of claim 25, wherein the status report includes results of a discovery process performed on the communications network.

29. The apparatus of claim 28, further comprising a discovery mechanism, coupled to the model control module and the communications network, the discovery mechanism being responsive to the model control module to invoke a discovery process on the communications network.

30. The apparatus of claim 25, wherein the status report includes results of a polling process.

31. The apparatus of claim 30, further comprising a polling manager coupled to the model control module and the communications network, the polling manager being responsive to the model control module to initiate the polling process on the device.

32. The apparatus of claim 25, further comprising a reset mechanism, coupled to the model control module and the communications network, the reset mechanism being responsive to the model control module to command a reset of the device.

33. The apparatus of claim 25, wherein the output of the model control module enables the model to indicate that the device is ready to be controlled by a network manager.

34. The apparatus of claim 25, wherein the output of the model control module disables the model to indicate that the device is not ready to be controlled by a network manager.

35. The apparatus of claim 25, wherein the predetermined plurality of states further includes:

an unknown state indicative that there is insufficient information to determine a capability of the device;

an initialized state indicative that the device has been discovered and is ready to be controlled by a network manager; and a lost state indicative that the device was previously ready to be controlled but did not respond to a status inquiry.

36. The apparatus of claim 25, wherein the means for maintaining includes a state machine coupled to the model control module and the model of the device, the state machine having a first input that receives the previous state of the device, a second input that receives the information regarding the device to a state machine, and an output that provides information based upon which the model control module maintains the model.

* * * * *

UNITED STATES PATENT AND TRADEMARK OFFICE
CERTIFICATE OF CORRECTION

PATENT NO.  : 5,734,642
DATED       : March 31, 1998
INVENTOR(S) : Vaishnavi, et. al.

It is certified that error appears in the above-identified patent and that said Letters Patent is hereby corrected as shown below:

Column 6, line 62, after "module" insert -- 14 --.

Signed and Sealed this

Ninth Day of February, 1999

Attest:

Attesting Officer

Acting Commissioner of Patents and Trademarks